(12) United States Patent
Chen et al.

(10) Patent No.: US 9,147,257 B2
(45) Date of Patent: Sep. 29, 2015

(54) CONSECUTIVE THIN EDGE DETECTION SYSTEM AND METHOD FOR ENHANCING A COLOR FILTER ARRAY IMAGE

(71) Applicant: Realtek Semiconductor Corp., Hsinchu (TW)

(72) Inventors: Shih-Tse Chen, Chu Pei (TW); Wen-Tsung Huang, Chia Yi (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 14/489,908

(22) Filed: Sep. 18, 2014

(65) Prior Publication Data

US 2015/0139554 A1    May 21, 2015

(30) Foreign Application Priority Data

Nov. 15, 2013 (TW) .............................. 102141629 A

(51) Int. Cl.
| G06K 9/00 | (2006.01) |
| G06K 9/32 | (2006.01) |
| G06T 7/00 | (2006.01) |
| G06K 9/46 | (2006.01) |

(52) U.S. Cl.
CPC ............ *G06T 7/0085* (2013.01); *G06K 9/4604* (2013.01)

(58) Field of Classification Search
None
See application file for complete search history.

(56) References Cited

U.S. PATENT DOCUMENTS

| 7,333,678 | B1 * | 2/2008 | Huang et al. .................. 382/300 |
| 7,620,241 | B2 * | 11/2009 | Fan et al. ...................... 382/167 |
| 8,363,132 | B2 * | 1/2013 | Hyun et al. .................... 348/273 |
| 9,008,421 | B2 * | 4/2015 | Chen et al. .................... 382/167 |
| 2011/0142331 | A1 * | 6/2011 | Chen ............................. 382/162 |

FOREIGN PATENT DOCUMENTS

| TW | 200620149 | 6/2006 |
| TW | I296482 | 5/2008 |
| TW | 200943230 A | 10/2009 |
| TW | I413977 B | 11/2013 |

* cited by examiner

*Primary Examiner* — Daniel Mariam
(74) *Attorney, Agent, or Firm* — Muncy, Geissler, Olds & Lowe, P.C.

(57) ABSTRACT

A consecutive thin edge detection system and method for enhancing color filter array image is disclosed in the present invention. The consecutive thin edge detection system includes a consecutive thin edge detector, a color gradient estimator and a direction indicator. The consecutive thin edge detector receives a color pixel array including a plurality of color pixels and alternately sets each color pixel as a target pixel. The consecutive thin edge detector detects a difference value between a plurality of first green pixels and a plurality of second green pixels nearby a target pixel, and determines whether the target pixel comprises a consecutive thin edge feature or not according to the difference value. The plurality of first green pixels are in red pixel rows which comprises a plurality red pixels and the plurality of first green pixels, and the plurality of second green pixels are in a blue pixel row which comprises blue pixels and the plurality of second green pixels.

20 Claims, 8 Drawing Sheets

CONSECUTIVE THIN EDGE DETECTION SYSTEM AND METHOD FOR ENHANCING A COLOR FILTER ARRAY IMAGE

This application claims the benefit of the filing date of Taiwan Application Ser. No. TW 102141629, filed on Nov. 15, 2013, the content of which is incorporated herein by reference.

BACKGROUND OF THE INVENTION (a) Field of the Invention

The invention relates to an image detection method and device, particularly to a consecutive thin edge detection system and a consecutive thin edge detection method for enhancing color filter array image.

(b) Description of the Related Art

In general, consumer electronics using a sensor for image acquisition such as digital cameras, video recorders, multimedia mobile phones, surveillance systems, video phones usually use a Bayer color filter array (Bayer CFA) covered on a sensor to record red, green and blue color information simultaneously to achieved the purpose of cost reduction. As shown in FIG. 1, in a Bayer color filter array BCFA, each position of a pixel records a color intensity of a kind of color. As shown in the figure, the position of R pixel records red color intensity and for example, on the right-hand side of the figure, the R spectrum filter only allows red light passing through to the pixel sensor cell Sens; the position of G pixel records green color intensity and for example, on the right-hand side of the figure, the G spectrum filter only allows green light passing through to the pixel sensor cell Sens; and the position of B pixel records blue color intensity and for example, on the right-hand side of the figure, the B spectrum filter only allows blue light passing through to the pixel sensor cell Sens. Therefore, consumer electronics may process an obtained raw Bayer CFA image via a color interpolation algorithm for missing color components to generate a full-color image.

It should be noted that the color interpolation algorithm includes analyzing image structure and color content so that the calculation result has critical impact on the final output image quality.

An edge detection method is usually the most effective and highly complicated step in color interpolation algorithm. If the edge direction of an image is not correctly determined by the edge detection method, the consecutive thin edge of an image is apt to appear significant distortion like maze pattern and false color. For example, as shown in FIG. 2, an ISO 12233 test chart is usually used to evaluate color interpolation efficiency. An instance of a test result including a maze pattern due to an incorrect edge direction determination is shown in spectra 5, 6, and 7.

BRIEF SUMMARY OF THE INVENTION

One object of the invention is to provide a consecutive thin edge detection system and a consecutive thin edge detection method for solving the problem of misjudging a consecutive thin edge.

One embodiment of the invention provides a consecutive thin edge detection system, including a consecutive thin edge detector, a color gradient estimator and a direction indicator. The consecutive thin edge detector receives a color pixel array including a plurality of color pixels and alternately sets each color pixel as a target pixel. The consecutive thin edge detector detects a difference value between a plurality of first green pixels and a plurality of second green pixels nearby a target pixel, and determines whether the target pixel comprises a consecutive thin edge feature or not according to the difference value. The plurality of first green pixels are in red pixel rows which comprises a plurality red pixels and the plurality of first green pixels, and the plurality of second green pixels are in a blue pixel row which comprises blue pixels and the plurality of second green pixels.

The color gradient estimator is coupled to the consecutive thin edge detector. The color gradient estimator estimates color gradients of the target pixels having the consecutive thin edge feature to generate a horizontal gradient value and a vertical gradient value. The direction indicator is coupled to the color gradient estimator. The direction indicator generates direction indicating values corresponding to the target pixels having the consecutive thin edge feature respectively according to the horizontal gradient value and the vertical gradient value.

Another embodiment of the invention provides a consecutive thin edge detection system, including a consecutive thin edge detector, a color gradient estimator and a direction indicator. The consecutive thin edge detector receives a color pixel array including a plurality of color pixels and alternately sets each color pixel as a target pixel. The consecutive thin edge detector detects a difference value between a plurality of first green pixels and a plurality of second green pixels nearby a target pixel, and determines whether each color pixel comprises a consecutive thin edge feature or not according to the difference value. The plurality of first green pixels are in red pixel rows which comprises a plurality red pixels and the plurality of first green pixels, and the plurality of second green pixels are in a blue pixel row which comprises blue pixels and the plurality of second green pixels. The color gradient estimator is coupled to the consecutive thin edge detector. The color gradient estimator a color gradient of each color pixel having the consecutive thin edge feature to generate a horizontal gradient value and a vertical gradient value. The direction indicator is coupled to the color gradient estimator. The direction indicator generates a direction indicating value for implementing interpolation on each color pixel according to the horizontal gradient value and the vertical gradient value.

Another embodiment of the invention provides a consecutive thin edge detection method, including the following steps: receiving a color pixel array including a plurality of color pixels; alternately setting each color pixel as a target pixel; detecting a difference value between a plurality of first green pixels and a plurality of second green pixels nearby a target pixel; determining whether the target pixel comprises a consecutive thin edge feature or not according to the difference value; estimating color gradients of the target pixels having the consecutive thin edge feature to generate a horizontal gradient value and a vertical gradient value; and generating direction indicating values corresponding to the target pixels having the consecutive thin edge feature respectively according to the horizontal gradient value and the vertical gradient value; wherein the plurality of first green pixels are in red pixel rows which comprises a plurality red pixels and the plurality of first green pixels, and the plurality of second green pixels are in a blue pixel row which comprises blue pixels and the plurality of second green pixels.

According to the consecutive thin edge detection system and method of the embodiments of the present invention, detection of thin edges and continuity of brightness of a color pixel array are used to correctly determine the consecutive thin edge feature of the color pixel. Then the consecutive thin edge feature is used to estimate the horizontal gradient value and the vertical gradient value so as to obtain precise interpolation direction to enhance consecutive thin edge detection effect for solving the problem in the prior art.

BRIEF DESCRIPTION OF THE DRAWINGS

FIG. 4A shows a schematic diagram illustrating a 5×5 Bayer color filter array of a target pixel at a position according to an embodiment of the invention.

FIG. 4B shows a schematic diagram illustrating a 5×5 Bayer color filter array of a target pixel at another position according to another embodiment of the invention.

DETAILED DESCRIPTION OF THE INVENTION

Figure 1:
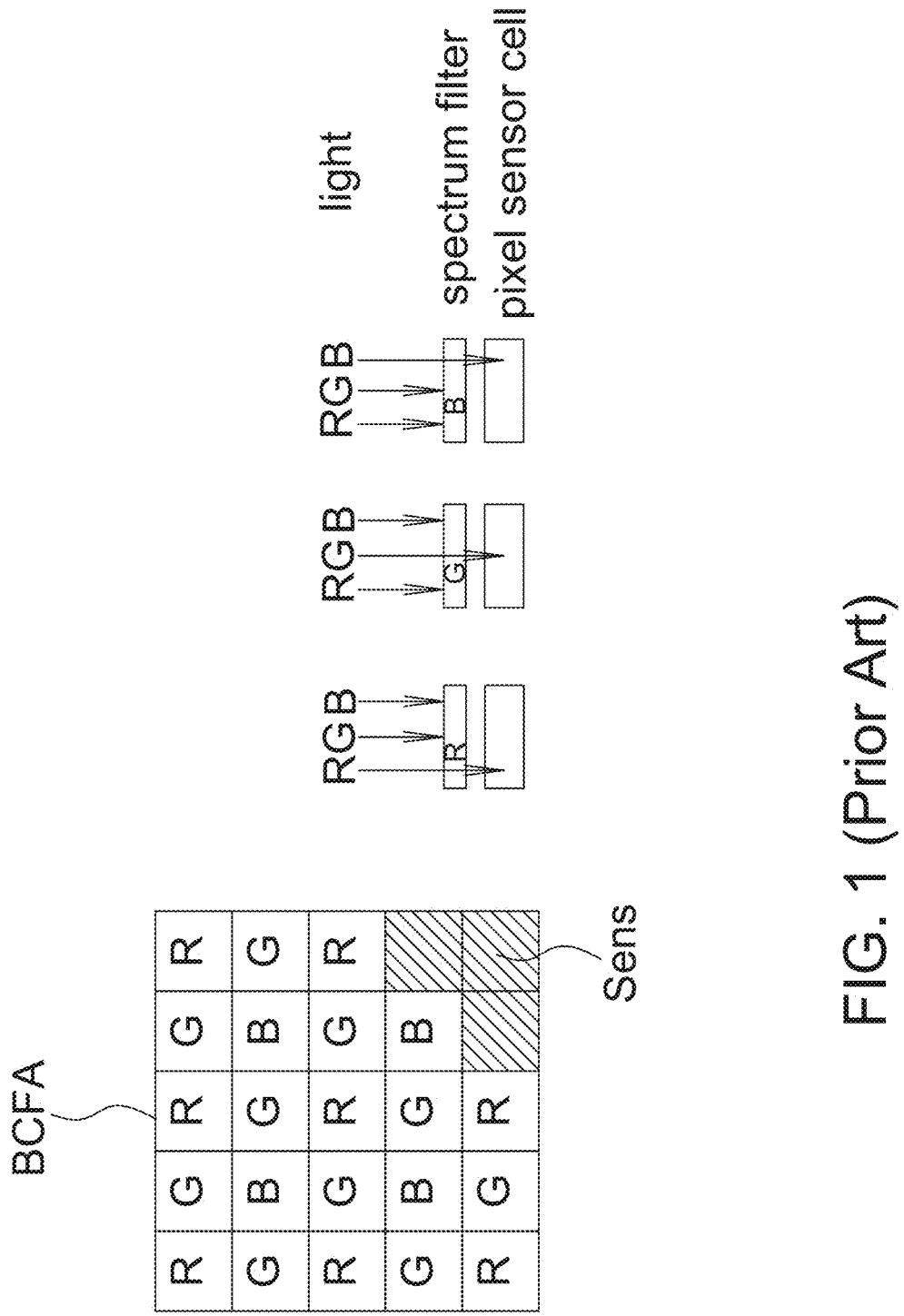
FIG. 1 shows a schematic diagram illustrating a Bayer color filter array according to the prior art.
Figure 2:
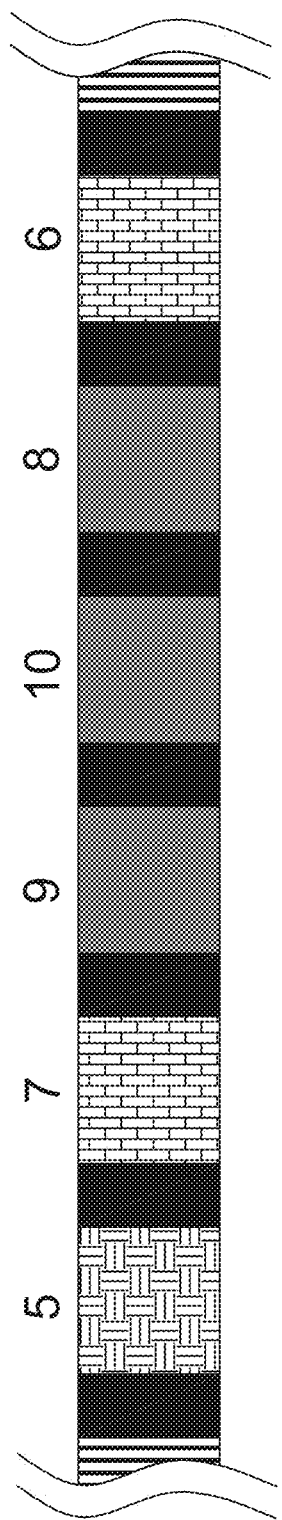
FIG. 2 shows a schematic testing diagram illustrating a standard test chart according to the prior art.
Figure 3A:
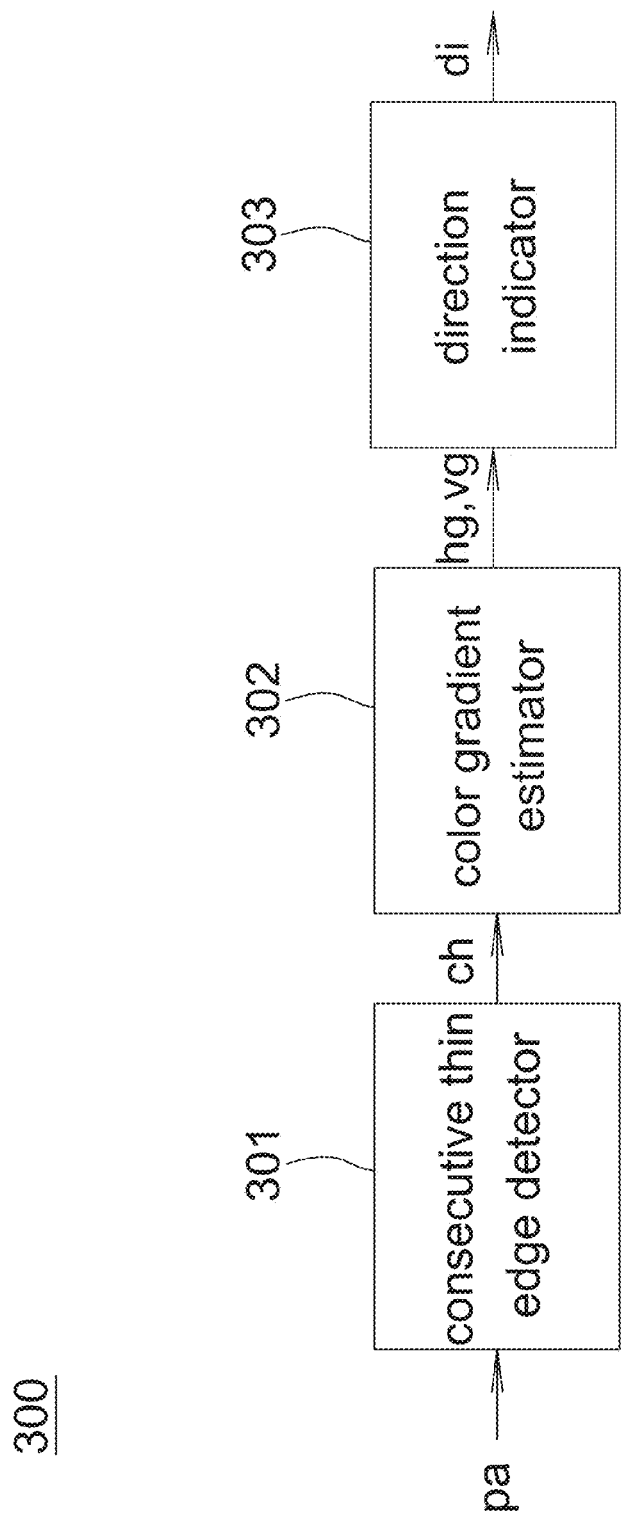
FIG. 3A shows a schematic diagram illustrating a consecutive thin edge detection system 300 according to an embodiment of the invention.

FIG. 3A shows a schematic diagram illustrating a consecutive thin edge detection system 300 according to an embodiment of the invention. The consecutive thin edge detection system 300 includes a consecutive thin edge detector 301, a color gradient estimator 302 and a direction indicator 303.

The consecutive thin edge detector 301 receives a color pixel array pa and the color pixel array pa includes a plurality of color pixels. The consecutive thin edge detector 301 alternately sets each color pixel as a target pixel, detects a difference value between a plurality of first green pixels and a plurality of second green pixels nearby the target pixel to determine whether the target pixel includes a consecutive thin edge feature ch or not according to the difference value. Therefore the consecutive thin edge feature ch of each color pixel in the color pixel array pa is generated. It should be noted that the plurality of first green pixels are in red pixel rows which includes a plurality red pixels and the plurality of first green pixels, and the plurality of second green pixels are in a blue pixel row which includes blue pixels and the plurality of second green pixels. The above mentioned "difference value" may be calculated between a first average value of the plurality of first green pixels in the red pixel rows and a second average value of the plurality of second green pixels in the blue pixel rows. In an embodiment, the color pixel array may be a Bayer color filter array (Bayer CFA) but the scope of the present invention is not limited to this example and may be any current color pixel array or any future color pixel array being developed.

The color gradient estimator 302 is coupled to the consecutive thin edge detector 301. The color gradient estimator 302 determines whether or not to estimate a color gradient according to the consecutive thin edge feature ch of each pixel. If it is determined to estimate color gradients for target pixels, the color gradient estimator 302 estimates a color gradients of a target pixel having the consecutive thin edge feature to generate a horizontal gradient value and a vertical gradient value. In an embodiment, the color gradient estimator 302 may calculate original color pixel values of a plurality of color pixels in a plurality of consecutive columns (for example consecutive three columns) nearby the target pixel in spatial domain to generate a horizontal gradient value hg. In an embodiment, the consecutive columns mean a plurality of adjacent columns having no interval between columns. The color gradient estimator 302 calculates original color pixel values of a plurality of pixels in a plurality of consecutive rows (for example consecutive three rows) nearby the target pixel in spatial domain to generate a vertical gradient value vg. In an embodiment, the consecutive rows mean a plurality of adjacent rows having no interval between rows. It should be noted that gradient estimation of the embodiment of the invention is not limited to three columns or three rows of the color pixel array and it is only an example. The gradient estimation of the invention may be used in another number of consecutive columns or rows.

The direction indicator 303 is coupled to the color gradient estimator 302. The direction indicator 303 generates direction indicating values di corresponding to the target pixels having the consecutive thin edge feature respectively according to the horizontal gradient value hg and the vertical gradient value vg.

The consecutive thin edge detection system 300 of the embodiment of the invention calculates a consecutive thin edge feature ch of each pixel and estimates the horizontal gradient value hg and the vertical gradient value vg of the consecutive thin edge to obtain a correct direction indicating value di of the consecutive thin edge. In this way, the image edge direction can be determined correctly without having significant distortion like maze pattern and false color so as to solve the problem in the prior art and enhance image display quality.

Figure 3B:
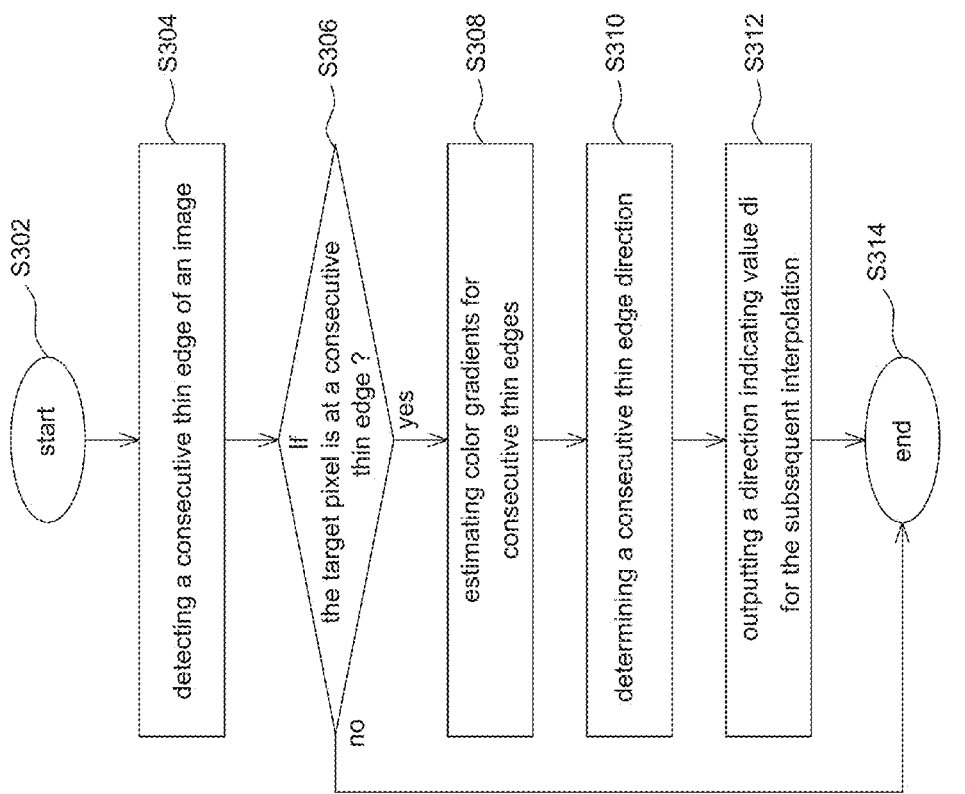
FIG. 3B shows a flow chart of a consecutive thin edge detection method according to an embodiment of the invention.

FIG. 3B shows a flow chart of a consecutive thin edge detection method according to an embodiment of the invention. The method includes the following steps:

Step S302: start.

Figures 4A, 4B:
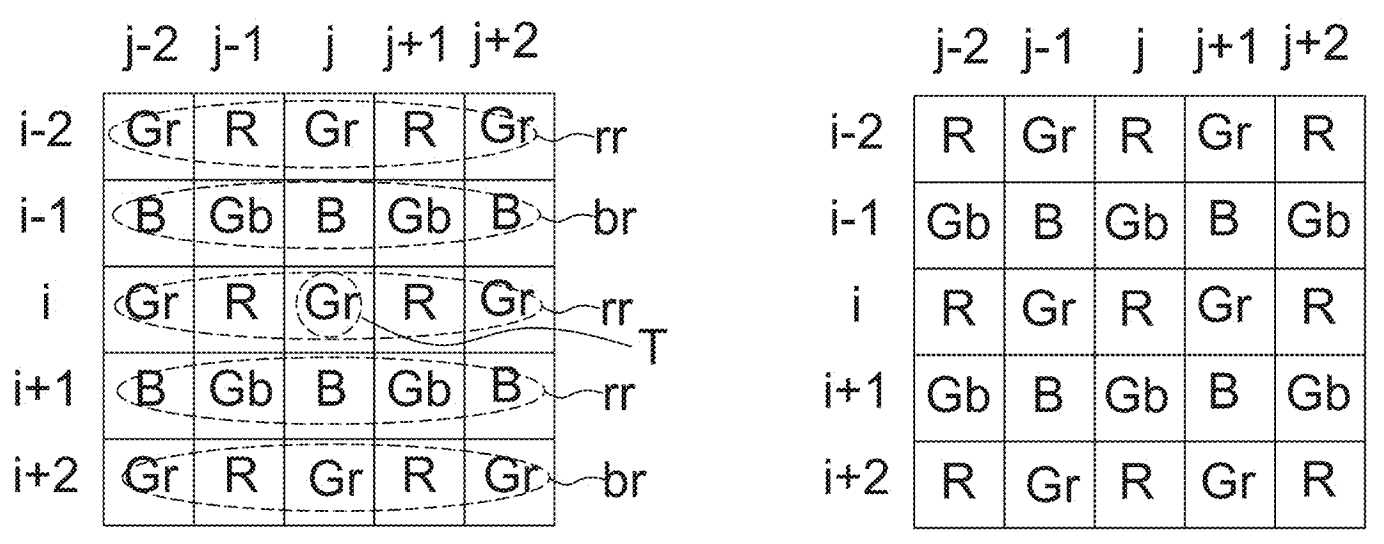

Step S304: detecting a consecutive thin edge of an image. Please refer to FIGS. 3A, 4A, and 4B. FIG. 4A and FIG. 4B separately show 5×5 Bayer pixel arrays with different target pixels. It should be noted that the 5×5 area is only used as an example and the color filter array of the embodiment of the invention can be an area with other size. In the figures, i and j represent the row and column positions of color pixels while the target pixel to be tested is set at the center position (i, j). For convenience in notation, the following uses $c_{(i,j)}$ to represent the original pixel color and $c \in \{R, Gr, Gb, B\}$ where R represents a red pixel, B represents a blue pixel, Gr represents a first green pixel positioned in a red pixel row rr which includes a plurality of red pixels R and a plurality of first green pixels Gr, and Gb represents a second green pixel positioned in a blue pixel row br which includes a plurality of blue pixels B and a plurality of second green pixels Gb.

At first, it is assumed that the color pixel circled by the dotted line T is the target pixel Gr and the consecutive thin edge detector 301 detects the target pixel Gr to generate the consecutive thin edge feature ch of the target pixel Gr. an example of the method for the consecutive thin edge detector 301 to detect the target pixel Gr is that the consecutive thin edge detector 301 calculates a first average value $\overline{Gr}(i,j)$ of a plurality of first green pixels Gr in the red pixel row rr and a second average value $\overline{Gb}(i,j)$ of a plurality of second green pixels Gb in the blue pixel row br, and calculates the difference value $\Delta GrGb(i,j)$ between the first average value $\overline{Gr}(i,j)$ and the second average value $\overline{Gb}(i,j)$ to generate the consecutive thin edge feature ch.

In an embodiment, the consecutive thin edge detection method according to the embodiment of the invention can effectively detect texture features of the consecutive thin edge, that is, variation in brightness of each column (row) with its adjacent columns (rows). For example, when a column is set as a target column, its adjacent columns may be at least a column at right side of the target column and at least a column at left side of the target column; When a row is set as a target row, its adjacent rows may be at least a row up to the target row and at least a row down to the target row. Further, the consecutive thin edge detection method can estimate whether the feature of brightness variation exists between the target pixel Gr(i,j) and its adjacent pixels or not. The consecutive thin edge detector 301 detects the target pixel Gr(i,j), calculates the average values $\overline{Gr}(i,j)$ and $\overline{Gb}(i,j)$ of a plurality of first green pixels Gr and a plurality of second green pixels Gb nearby the target pixel Gr(i,j), and calculates the difference value $\Delta GrGb(i,j)$ between the average values $\overline{Gr}(i,j)$ and $\overline{Gb}(i,j)$ as the reference for the degree of thin edge variation. As an example of the average values $\overline{Gr}(i,j)$ and $\overline{Gb}(i,j)$ and the difference value $\Delta GrGb(i,j)$ are as follows:

$$\overline{Gr}_{(i,j)}=(4Gr_{(i,j)}+Gr_{(i-2,j)}+Gr_{(i+2,j)}+Gr_{(i,j-2)}+Gr_{(i,j+2)})/8 \quad (1)$$

$$\overline{Gb}_{(i,j)}=(Gb_{(i-1,j-1)}+Gb_{(i-1,j+1)}+Gb_{(i+1,j-1)}+Gb_{(i+1,j+1)})/4 \quad (2)$$

$$\Delta GrGb_{(i,j)}=|\overline{Gr}_{(i,j)}-\overline{Gb}_{(i,j)}| \quad (3)$$

where $\overline{Gr}_{(i,j)}=(4Gr_{(i,j)}+Gr_{(i-2,j)}+Gr_{(i+2,j)}+Gr_{(i,j-2)}+Gr_{i,j+2})/8$ is the average value of first green pixels $Gr_{(i,j)}, Gr_{(i-2,j)}, Gr_{(i+2,j)}, Gr_{(i,j-2)}, Gr_{(i,j+2)}$ in red pixel row rr nearby the target pixel Gr(i,j).
$\overline{Gb}_{(i,j)}=(Gb_{(i-1,j-1)}+Gb_{(i-1,j+1)}+Gb_{(i+1,j-1)}+Gb_{(i+1,j+1)})/4$ is the average value of second green pixels $Gb_{(i-1,j-1)}, Gb_{(i-1,j+1)}, Gb_{(i+1,j-1)}, Gb_{(i+1,j+1)}$ in blue pixel row br nearby the pixel $\overline{Gb}(i,j)$. $\Delta GrGb_{(i,j)}=|\overline{Gr}_{(i,j)}-\overline{Gb}_{(i,j)}|$ is the absolute value of the difference value between the average value of first green pixels $Gr_{(i,j)}, Gr_{(i-2,j)}, Gr_{(i+2,j)}, Gr_{(i,j-2)}, Gr_{(i,j+2)}$ in red pixel row rr and the average value of second green pixels $Gb_{(i-1,j-1)}, Gb_{(i-1,j-1)}, Gb_{(i+1,j-1)}, Gb_{(i+1,j+1)}$ in blue pixel row br.

Then, the consecutive thin edge detector 301 compares first green pixels in red pixel row rr with second green pixels in blue pixel row br to determine the degree of continuity of the color pixel array. In an embodiment, the consecutive thin edge detector 301 compares brightness of Gr and Gb surrounding the target pixel Gr(i,j) to generate a comparison result. Then, the consecutive thin edge detector 301 uses the comparison result as a reference for the degree of continuity, and accumulates and stores the comparison results in a counter GrGb_CMP_SUM$_{(i,j)}$. A example of comparing equations form the consecutive thin edge detector 301 is shown in the following.

$$GrGb\_CMP\_SUM_{(i,j)}=GrGb\_CMP\_SUM_{(i,j)}+ (Gr_{i,j}>Gb_{(i-1,j-1)})?1:0$$

$$GrGb\_CMP\_SUM_{(i,j)}=GrGb\_CMP\_SUM_{(i,j)}+ (Gr_{i,j}>Gb_{(i-1,j+1)})?1:0$$

$$GrGb\_CMP\_SUM_{(i,j)}=GrGb\_CMP\_SUM_{(i,j)}+ (Gr_{(i,j)}>Gb_{(i+1,j-1)})?1:0$$

$$GrGb\_CMP\_SUM_{(i,j)}=GrGb\_CMP\_SUM_{(i,j)}+ (Gr_{(i,j)}>Gb_{(i+1,j+1)})?1:0$$

$$GrGb\_CMP\_SUM_{(i,j)}=GrGb\_CMP\_SUM_{(i,j)}+ (Gr_{(i,j-2)}>Gb_{(i-1,j-1)})?1:0$$

$$GrGb\_CMP\_SUM_{(i,j)}=GrGb\_CMP\_SUM_{(i,j)}+ (Gr_{(i-2,j)}>Gb_{(i-1,j-1)})?1:0$$

$$GrGb\_CMP\_SUM_{(i,j)}=GrGb\_CMP\_SUM_{(i,j)}+ (Gr_{(i-2,j)}>Gb_{(i-1,j+1)})?1:0$$

$$GrGb\_CMP\_SUM_{(i,j)}=GrGb\_CMP\_SUM_{(i,j)}+ (Gr_{(i,j+2)}>Gb_{(i-1,j+1)})?1:0$$

$$GrGb\_CMP\_SUM_{(i,j)}=GrGb\_CMP\_SUM_{(i,j)}+ (Gr_{(i,j+2)}>Gb_{(i+1,j+1)})?1:0$$

$$GrGb\_CMP\_SUM_{(i,j)}=GrGb\_CMP\_SUM_{(i,j)}+ (Gr_{(i+2,j)}>Gb_{(i+1,j-1)})?1:0$$

$$GrGb\_CMP\_SUM_{(i,j)}=GrGb\_CMP\_SUM_{(i,j)}+ (Gr_{(i+2,j)}>Gb_{(i+1,j+1)})?1:0$$

$$GrGb\_CMP\_SUM_{(i,j)}=GrGb\_CMP\_SUM_{(i,j)}+ (Gr_{(i,j-2)}>Gb_{(i+1,j-1)})?1:0 \quad (4)$$

Figure 5A:
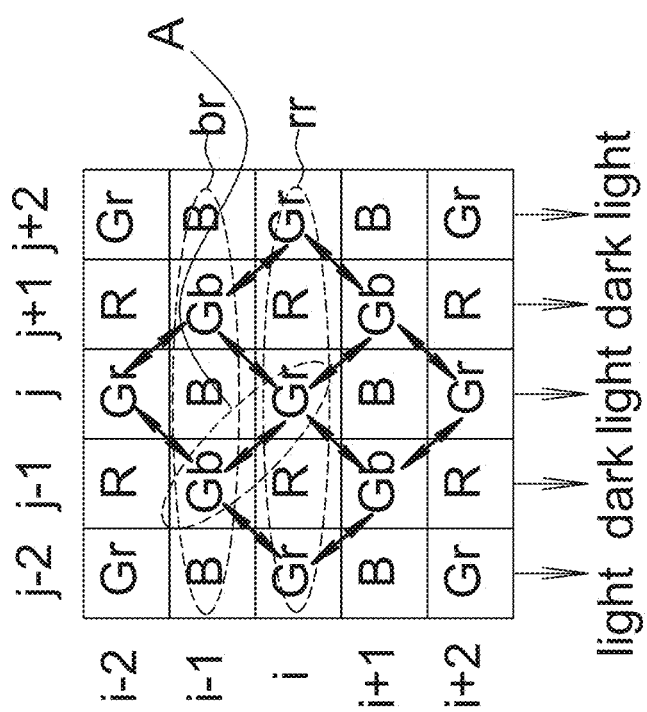
FIG. 5A shows a schematic diagram illustrating a brightness continuity detection for columns nearby a target pixel in a 5×5 Bayer color filter array according to an embodiment of the invention.
Figure 5B:
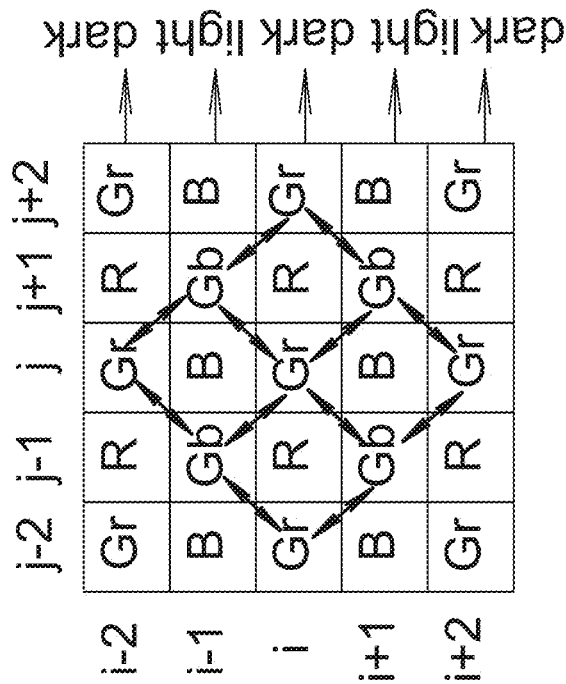
FIG. 5B shows a schematic diagram illustrating a brightness continuity detection for rows near by a target pixel in a 5×5 Bayer color filter array according to an embodiment of the invention.

Please refer to FIG. 5A, one of equations GrGb_CMP_SUM$_{(i,j)}$=GrGb_CMP_SUM$_{(i,j)}$+(Gr$_{(i,j)}$>Gb$_{(i-1,j-1)}$)?1:0 in equation (4) is used as one example to be explained as follows. Referring to the position circled by the dotted line A of FIG. 5A, the consecutive thin edge detector 301 compares brightness of first green pixel Gr(i,j) in red pixel row rr with brightness of second green pixel Gb(i−1,j−1) in blue pixel row br. If the brightness of first green pixel Gr(i,j) in red pixel row rr is larger than that of second green pixel Gb(i−1,j−1) in blue pixel row br, the comparison result is 1. If the brightness of first green pixel Gr(i,j) in red pixel row rr is smaller than that of second green pixel Gb(i−1,j−1) in blue pixel row br, the comparison result is 0. Then, the comparison result is accumulated and stored in the counter GrGb_CMP_SUM$_{(i,j)}$. One of ordinary skill in the art can use equation (4) together with the position pointed by arrows in FIG. 5A to generate the comparison results of the rest first green pixels Gr in red pixel row rr and the rest of second green pixels Gb in blue pixel row br, and to accumulate and store the comparison results in the counter GrGb_CMP_SUM$_{(i,j)}$. In this way, it can determine whether the consecutive bright and dark interleaving states, from left to right in FIG. 5A or from top to bottom shown in FIG. 5B, exist between columns or rows of the color pixel array. In another embodiment, when the target pixel is set shown in FIG. 4B and the target pixel is R, equations (1)~(3) can be adjusted to become equation (5) shown in the following.

$$\overline{Gr}_{(i,j)}=(2Gr_{(i,j-1)}+2Gr_{(i,j+1)}+Gr_{(i-2,j-1)}+Gr_{(i-2,j+1)}+ Gr_{(i+2,j-1)}+Gr_{(i+2,j+1)})/8$$

$$\overline{Gb}_{(i,j)}=(2Gb_{(i-1,j)}2Gb_{(i+1,j)}+Gb_{(i-1,j-2)}+Gb_{(i-1,j+2)}+Gb_{(i+1,j-2)}+ GB_{(i+1,j+2)})/8$$

$$\Delta GrGb_{(i,j)}=|\overline{Gr}_{(i,j)}-\overline{Gb}_{(i,j)}|. \quad (5)$$

One embodiment of equation (4) can be adjusted to become equation (6) shown in the following.

$$GrGb\_CMP\_SUM_{(i,j)}=GrGb\_CMP\_SUM_{(i,j)}+ (Gr_{(i,j-1)}>Gb_{(i-1,j)})?1:0$$

$$GrGb\_CMP\_SUM_{(i,j)}=GrGb\_CMP\_SUM_{(i,j)}+ (Gr_{i,j+1}>Gb_{(i-1,j)})?1:0$$

$$GrGb\_CMP\_SUM_{(i,j)}=GrGb\_CMP\_SUM_{(i,j)}+ (Gr_{(i,j-1)}>Gb_{(i+1,j)})?1:0$$

$$GrGb\_CMP\_SUM_{(i,j)}=GrGb\_CMP\_SUM_{(i,j)}+$$
$$(Gr_{(i,j+1)}>Gb_{(i+1,j)})?1:0$$

$$GrGb\_CMP\_SUM_{(i,j)}=GrGb\_CMP\_SUM_{(i,j)}+$$
$$(Gr_{(i-2,j-1)}>Gb_{(i-1,j)})?1:0$$

$$GrGb\_CMP\_SUM_{(i,j)}=GrGb\_CMP\_SUM_{(i,j)}+$$
$$(Gr_{(i-2,j+1)}>Gb_{(i-1,j)})?1:0$$

$$GrGb\_CMP\_SUM_{(i,j)}=GrGb\_CMP\_SUM_{(i,j)}+$$
$$(Gr_{(i+2,j-1)}>Gb_{(i+1,j)})?\mathbf{1:0}$$

$$GrGb\_CMP\_SUM_{(i,j)}=GrGb\_CMP\_SUM_{(i,j)}+$$
$$(Gr_{(i+2,j+1)}>Gb_{(i+1,j)})?1:0$$

$$GrGb\_CMP\_SUM_{(i,j)}=GrGb\_CMP\_SUM_{(i,j)}+$$
$$(Gr_{(i,j+1)}>Gb_{(i+1,j+2)})?1:0$$

$$GrGb\_CMP\_SUM_{(i,j)}=GrGb\_CMP\_SUM_{(i,j)}+$$
$$(Gr_{(i,j+1)}>Gb_{(i+1,j+2)})?1:0$$

$$GrGb\_CMP\_SUM_{(i,j)}=GrGb\_CMP\_SUM_{(i,j)}+$$
$$(Gr_{(i,j-1)}>Gb_{(i-1,j-2)})?1:0$$

$$GrGb\_CMP\_SUM_{(i,j)}=GrGb\_CMP\_SUM_{(i,j)}+$$
$$(Gr_{(i,j+1)}>Gb_{(i+1,j-2)})?1:0 \quad (6)$$

Figure 5D:
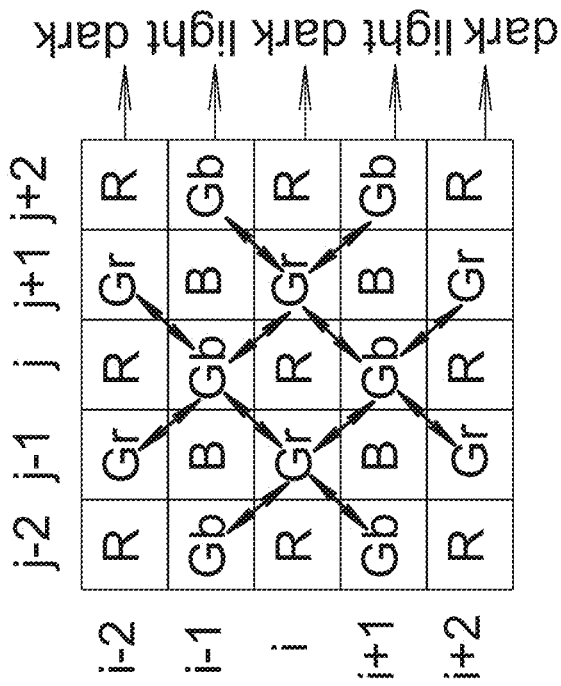
FIG. 5D shows a schematic diagram illustrating a brightness continuity detection for columns nearby another target pixel in a 5×5 Bayer color filter array according to an embodiment of the invention.
Figure 5C:
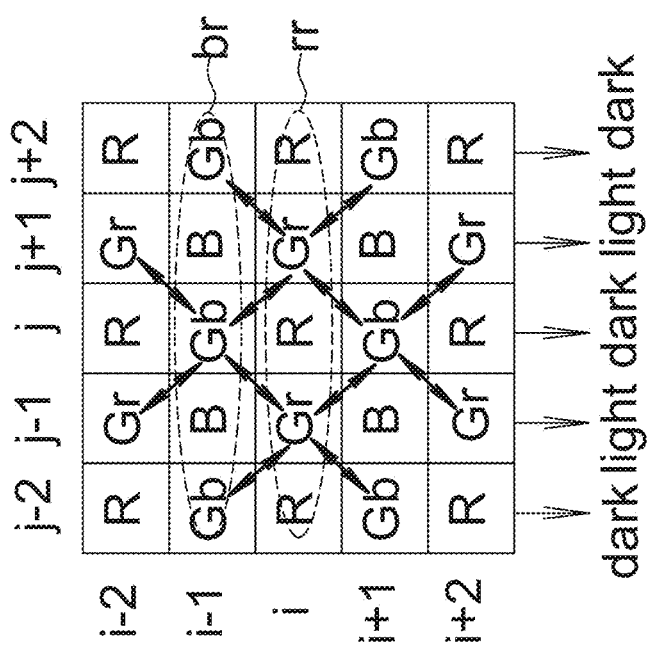
FIG. 5C shows a schematic diagram illustrating a brightness continuity detection for columns nearby another target pixel in a 5×5 Bayer color filter array according to an embodiment of the invention.

One of ordinary skill in the art can understand the operational method of equations (5) and (6) with reference to the above illustration and use equation (6) together with the position pointed by arrows in FIG. 5C to generate the comparison results of the first green pixels Gr in red pixel row rr and the second green pixels Gb in blue pixel row br. Accumulating the brightness comparison results by equation (6) every time and storing them in counter GrGb_CMP_SUM$_{(i,j)}$, the brightness variation of pixels nearby the target pixel can be obtained so as to achieve the effect of determining the continuity of brightness variation of columns or rows of the color pixel array, shown in FIGS. 5C and 5D, respectively.

Step S306: determining whether the target pixel is at a consecutive thin edge or not; go to step S308 if yes; go to step S314 if no. In an embodiment, according to calculation results from equations (1)~(3) and (4), when the following conditions are satisfied, the target pixel is determined to be a pixel at a consecutive thin edge. When the degree of the thin edge variation (the above difference value) is larger than a first threshold value Th1; and the degree of continuity of the target pixel (the brightness comparison result by accumulating the brightness variation) is larger than a second threshold value Th2 or smaller than a third threshold value Th3, the target pixel is determined to have continuity. When the above conditions are satisfied, the target pixel is a pixel at a consecutive thin edge. Determining whether the target pixel is a pixel at a consecutive thin edge or not can be processed by the following equation:

$$\text{if } (\Delta GrGb_{(i,j)}>Th_1 \&\& ((GrGb\_CMP\_SUM_{(i,j)}>Th_2)||$$
$$(GrGb\_CMP\_SUM_{(i,j)}<Th_3)) \quad (7)$$

In the above equation, if $\Delta GrGb_{(i,j)}$ is larger than the first threshold value Th1, the target pixel is determined to be at a consecutive thin edge. If GrGb_CMP_SUM$_{(i,j)}$ is larger than a second threshold value Th2 or smaller than a third threshold value Th3, the target pixel is determined to have continuity. It should be noted that in another embodiment, an order of "1" and "0"(1:0) of equations (4) and (6) can be replaced by 0:1.

One of ordinary skill in the art can determining if the target pixel is a pixel at a consecutive thin edge when the target pixel is a second green pixel Gb or a blue color pixel B the consecutive thin edge by referring to equations (1)~(4). Thus, its details will not be given hereinafter.

Then, the consecutive thin edge detector 301 determines whether a color pixel has a consecutive thin edge feature or not according to whether the color pixel has a thin edge (difference value) and has continuity (brightness variation) or not.

Step S308: estimating color gradients for consecutive thin edges. The color gradient estimator 302 calculates original color pixel values of the plurality of color pixels in adjacent columns of the target pixel in adjacent columns in spatial domain to generate a horizontal gradient value hg. The color gradient estimator 302 calculates original color pixel values of the plurality of color pixels in adjacent rows of the target pixel in spatial domain to generate the vertical gradient value vg. It should be noted that in an embodiment, estimating color gradients for consecutive thin edges may be only to estimate the horizontal gradient value for a color pixel having the consecutive thin edge feature but not for the whole image so as to reduce resource consumption.

In an embodiment, referring to FIG. 4A, it is assumed that the target pixel Gr(i,j) in the figure is a color pixel having the consecutive thin edge feature and the color gradient estimator 302 sets a column including the target pixel Gr(i,j) to be a target column. The color gradient estimator 302 calculates first values between the color pixels in the target column and the other color pixels in one column to the left of the target column, and calculates second values between the color pixels in the target column and the other color pixels in one column to the right of the target column, and generates the horizontal gradient value hg according to the first values and the second values. For example, a first value may be a difference between the color pixel Gr(i-2,j) in the same column as the target pixel Gr(i,j) and another color pixel R(i-2,j-1) in the same row but one column to the left with respect to the color pixel Gr(i-2,j). The second value may be a difference between the color pixel Gr(i-2,j) and another color pixel R(i-2,j+1) in the same row but one column to the right with respect to the color pixel Gr(i-2,j). That is, the first value equals to Gr(i-2,j)-R(i-2,j-1) and the second value equals to Gr(i-2,j)-R(i-2,j+1). Another first value is a difference between B(i-1,j) and another color pixel Gb(i-1,j-1) in the same row but one column to the left with respect to B(i-1,j). Another second value is a difference between B(i-1,j) and another color pixel Gb(i-1,j+1) in the same row but one column to the right with respect to B(i-1,j). That is, another first value equals to B(i-1,j)-Gb(i-1,j-1) and another second value equals to B(i-1,j)-Gb(i-1,j+1)The rest of first and second values can be calculated in the analogous way. Then, the first values and second values are summed to generate the horizontal gradient value hg. Therefore, the relationship of brightness variation between the column of the target pixel Gr(i,j) and the adjacent columns can be obtained.

In an embodiment, referring to FIG. 4A, the color gradient estimator 302 sets a row including the target pixel to be a target row. The color gradient estimator 302 calculates third values between the color pixels in the target row and the other color pixels in one row up the target row, and calculates forth values between the color pixels in the target row and the other color pixels in one row down the target row, and generates the vertical gradient value vg according to the third values and the forth values. For example, A third value is a difference between the color pixel Gr(i,j-2) in the same row as the target pixel Gr(i,j) and another color pixel B(i-1,j-2) in the same column but one row up with respect to the color pixel Gr(i,j-2). A fourth value is a difference between the color pixel Gr(i,j-2) and another color pixel B(i+1,j-2) in the same column but one row down with respect to the color pixel Gr(i,j-2). That is, the third value equals to Gr(i,j-2)-B(i-1,j-2) and the fourth value equals to Gr(i,j−2)−B(i+1,j−2). Another third value is a difference between R(i,j−1) and another color pixel Gb(i−1,j−1) in the same column but one row up with respect to R(i,j−1). Another fourth value is a difference between R(i,j−1) and another color pixel Gb(i+1,j−1) in the same column but one row down with respect to R(i,j−1). That is, another third value equals to R(i,j−1)−Gb(i−1,j−1) and another fourth value equals to R(i,j−1)−Gb(i+1,j−1). The rest of third values and fourth values can be calculated in the analogous way. Then, the third and fourth values are summed to generate the vertical gradient value vg. Therefore, the relationship of brightness variation between the row of the target pixel Gr(i,j) and the adjacent rows can be obtained.

In another embodiment, referring to FIG. 4A, it is assumed that the target pixel Gr(i,j) is a pixel having the consecutive thin edge feature and the color gradient estimator 302 calculates a color horizontal gradient between color pixels positioned in the same row as the target pixel Gr(i,j) and other color pixels nearby the color pixels in the same row as the target pixel Gr(i,j) along the horizontal direction in the color pixel array so as to generate the horizontal gradient value hg. Referring to FIG. 4A, an embodiment of the equation is: hg=abs(Gr(i,j−2)−R(i,j−1))+abs(R(i,j−1)−Gr(i,j))+abs(Gr(i,j)−R(i,j+1))+abs(R(i,j+1)−Gr(i,j+2)). Further, the color gradient estimator 302 calculates a color vertical gradient between color pixels positioned in the same column as the target pixel Gr(i,j) and other color pixels nearby the color pixels in the same column as the target pixel Gr(i,j) along the vertical direction in the color pixel array so as to generate the vertical gradient value vg and, referring to FIG. 4A, an embodiment of the equation is: vg=abs(Gr(j,i−2)−B(i−1,j))+abs(B(i−1,j)−Gr(i,j))+abs(Gr(i,j)−B(i+1,j))+abs(B(i+1,j)−Gr(i+2,j)).

It should be noted that in an embodiment the color gradient estimator 302 may have an estimating range be different from a detecting range detected by the consecutive thin edge detector 301.

Step S310: determining a consecutive thin edge direction. After the color gradient values along horizontal and vertical directions of the consecutive thin edge are calculated, the direction indicator 303 compares the horizontal gradient value hg with the vertical gradient value vg. If the horizontal gradient value hg is smaller than the vertical gradient value vg, the horizontal edge direction indication is outputted for the subsequent interpolation. On the contrary, if the vertical gradient value vg is smaller than the horizontal gradient value hg, the vertical edge direction indication is outputted for the subsequent interpolation.

Step S312: outputting a direction indicating value di for the subsequent interpolation by the direction indicator 303.

Step S314: end.

In an embodiment, estimating color gradients for consecutive thin edges and direction determination described in the above are only used as an example and the invention is not limited to the above example. For example, in an embodiment, if the gradient estimation requires more precision, the color differences of the positions in the horizontal column and vertical row with respect to the target pixel can be weighted and then summed.

Figure 6:
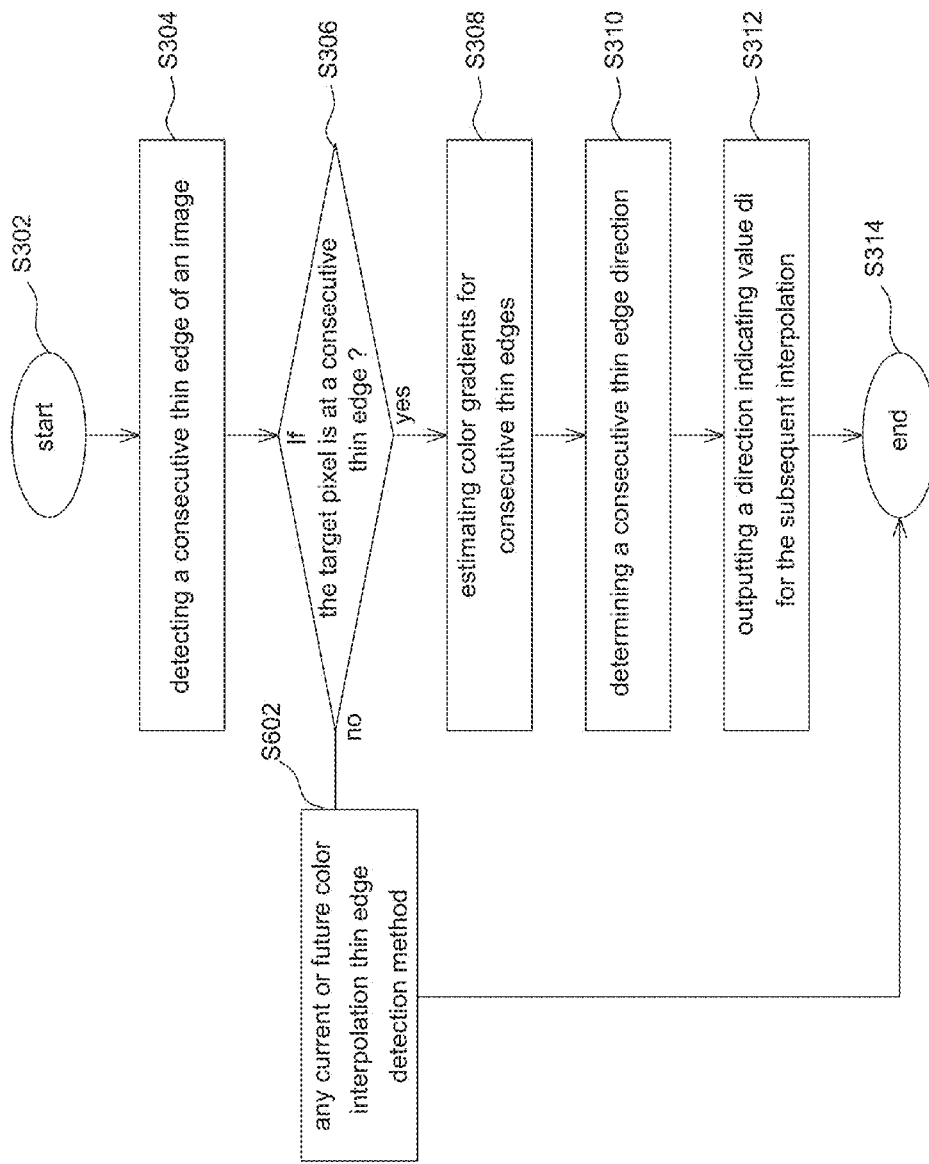
FIG. 6 shows a flow chart of a consecutive thin edge detection method according to another embodiment of the invention.

Besides, for example, any current or future color interpolation thin edge detection method like step S602 shown in FIG. 6 can be integrated with the consecutive thin edge detection system and method according to the present invention to enhance image reconstruction quality.

The consecutive thin edge detection system and method according to the embodiments of the present invention use the thin edge and continuity detection of a color pixel array to correctly determine the consecutive thin edge feature of the pixel and then use the consecutive thin edge feature to estimate the horizontal gradient value and the vertical gradient value so as to obtain precise information about interpolation direction to enhance consecutive thin edge detection effect of a color filter array image. Thus, it is useful for the subsequent other image processing to enhance image reconstruction quality.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A consecutive thin edge detection system, comprising:
a consecutive thin edge detector, receiving a color pixel array including a plurality of color pixels, alternately setting each color pixel as a target pixel, detecting a difference value between a plurality of first green pixels and a plurality of second green pixels nearby the target pixel, and determining whether the target pixel comprises a consecutive thin edge feature or not according to the difference value; wherein the plurality of first green pixels are in red pixel rows which comprises a plurality red pixels and the plurality of first green pixels, and the plurality of second green pixels are in a blue pixel row which comprises blue pixels and the plurality of second green pixels;
a color gradient estimator, coupled to the consecutive thin edge detector, wherein the color gradient estimator estimates color gradients of the target pixels having the consecutive thin edge feature to generate a horizontal gradient value and a vertical gradient value; and
a direction indicator, coupled to the color gradient estimator, wherein the direction indicator generates direction indicating values corresponding to the target pixels having the consecutive thin edge feature respectively according to the horizontal gradient value and the vertical gradient value.

2. The system according to claim 1, wherein the difference value is calculated between a first average value of the plurality of first green pixels in the red pixel rows and a second average value of the plurality of second green pixels in the blue pixel rows.

3. The system according to claim 1, wherein the consecutive thin edge detector compares brightness of the first green pixels with brightness of the second green pixels to determine continuity of brightness of pixels nearby the target pixel.

4. The system according to claim 3, wherein the consecutive thin edge detector determines whether the target pixel is positioned at a consecutive thin edge of an image according to whether the target pixel comprises the consecutive thin edge feature and the continuity of brightness or not.

5. The system according to claim 1, wherein the operation of estimating color gradients comprises:
calculating original color pixel values of the plurality of color pixels in adjacent columns of the target pixel in adjacent columns in spatial domain to generate the horizontal gradient value; and
calculating original color pixel values of the plurality of color pixels in adjacent rows of the target pixel in spatial domain to generate the vertical gradient value.

6. The system according to claim 1, wherein setting a column comprising the target pixel be a target column, and the color gradient estimator calculates first values between the color pixels in the target column and the other color pixels in one column to the left of the target column, and calculates second values between the color pixels in the target column and the other color pixels in one column to the right of the target column, and generates the horizontal gradient value according to the first values and the second values.

7. The system according to claim 1, wherein setting a row comprising the target pixel be a target row, and the color gradient estimator calculates third values between the color pixels in the target row and the other color pixels in one row up the target row, and calculates forth values between the color pixels in the target row and the other color pixels in one row down the target row, and generates the vertical gradient value according to the third values and the forth values.

8. The system according to claim 1, wherein setting a column comprising the target pixel be a target column, and the color gradient estimator calculates a difference between the color pixels in the target column and the other color pixels in adjacent columns along a horizontal direction to generate the horizontal gradient value.

9. The system according to claim 1, wherein setting a row comprising the target pixel be a target row, the color gradient estimator calculates a difference between the color pixels in the target row and the other color pixels in adjacent rows along a vertical direction to generate the vertical gradient value.

10. The system according to claim 1, wherein an estimating range of the color gradient estimator is different from a detecting range of the consecutive thin edge detector.

11. A consecutive thin edge detection system, comprising:
a consecutive thin edge detector, receiving a color pixel array including a plurality of color pixels, alternately setting each color pixel as a target pixel, detecting a difference value between a plurality of first green pixels and a plurality of second green pixels nearby the target pixel, and determining whether each color pixel comprises a consecutive thin edge feature or not according to the difference value; wherein the plurality of first green pixels are in red pixel rows which comprises a plurality red pixels and the plurality of first green pixels, and the plurality of second green pixels are in a blue pixel row which comprises blue pixels and the plurality of second green pixels;
a color gradient estimator, coupled to the consecutive thin edge detector, wherein the color gradient estimator estimates a color gradient of each color pixel having the consecutive thin edge feature to generate a horizontal gradient value and a vertical gradient value; and
a direction indicator, coupled to the color gradient estimator, wherein the direction indicator generates a direction indicating value for implementing interpolation on each color pixel according to the horizontal gradient value and the vertical gradient value.

12. The system according to claim 11, wherein the difference value is calculated between a first average value of the plurality of first green pixels in the red pixel rows and a second average value of the plurality of second green pixels in the blue pixel rows.

13. The system according to claim 12, wherein the consecutive thin edge detector compares brightness of the first green pixels with brightness of the second green pixels to determine a degree of continuity of each color pixel.

14. The system according to claim 13, wherein, if the thin edge feature value of one of the color pixels is larger than a first threshold value and the degree of continuity of the one of the color pixels is larger than a second threshold value or smaller than a third threshold value, the one of the color pixels is determined to be positioned at a consecutive thin edge.

15. The system according to claim 12, wherein the operation of estimating color gradients comprises:
calculating original color pixel values of the plurality of color pixels in adjacent columns of the target pixel in adjacent columns in spatial domain to generate the horizontal gradient value; and
calculating original color pixel values of the plurality of color pixels in adjacent rows of the target pixel in spatial domain to generate the vertical gradient value.

16. A consecutive thin edge detection method, comprising:
receiving a color pixel array including a plurality of color pixels;
alternately setting each color pixel as a target pixel;
detecting a difference value between a plurality of first green pixels and a plurality of second green pixels nearby the target pixel;
determining whether the target pixel comprises a consecutive thin edge feature or not according to the difference value;
estimating color gradients of the target pixels having the consecutive thin edge feature to generate a horizontal gradient value and a vertical gradient value; and
generating direction indicating values corresponding to the target pixels having the consecutive thin edge feature respectively according to the horizontal gradient value and the vertical gradient value;
wherein the plurality of first green pixels are in red pixel rows which comprises a plurality red pixels and the plurality of first green pixels, and the plurality of second green pixels are in a blue pixel row which comprises blue pixels and the plurality of second green pixels.

17. The method according to claim 16, wherein the difference value is calculated between a first average value of the plurality of first green pixels in the red pixel rows and a second average value of the plurality of second green pixels in the blue pixel rows.

18. The method according to claim 17, further comprises:
comparing brightness of the first green pixels with brightness of the second green pixels to determine a degree of continuity of each color pixel.

19. The method according to claim 18, wherein, if the thin edge feature value of one of the color pixels is larger than a first threshold value and the degree of continuity of the one of the color pixels is larger than a second threshold value or smaller than a third threshold value, the one of the color pixels is determined to be positioned at a consecutive thin edge.

20. The method according to claim 16, wherein the step of estimating color gradient comprises:
calculating an original color pixel value of the plurality of color pixels having the consecutive thin edge feature in consecutive columns in spatial domain to generate the horizontal gradient value; and
calculating an original color pixel value of the plurality of color pixels having the consecutive thin edge feature in consecutive rows in spatial domain to generate the vertical gradient value.

* * * * *